United States Patent
Kataoka et al.

(10) Patent No.: US 10,792,887 B2
(45) Date of Patent: Oct. 6, 2020

(54) DECORATIVE SHEET

(71) Applicant: Dai Nippon Printing Co., Ltd., Tokyo (JP)

(72) Inventors: Sakie Kataoka, Tokyo (JP); Emi Hirose, Tokyo (JP); Masatoshi Sutou, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 15/515,244

(22) PCT Filed: Sep. 30, 2015

(86) PCT No.: PCT/JP2015/077758
§ 371 (c)(1),
(2) Date: Mar. 29, 2017

(87) PCT Pub. No.: WO2016/052629
PCT Pub. Date: Apr. 7, 2016

(65) Prior Publication Data
US 2017/0217123 A1 Aug. 3, 2017

(30) Foreign Application Priority Data
Sep. 30, 2014 (JP) .................................. 2014-201911

(51) Int. Cl.
| | |
|---|---|
| B32B 3/30 | (2006.01) |
| B44C 1/24 | (2006.01) |
| B44C 3/02 | (2006.01) |
| B32B 27/00 | (2006.01) |
| B29C 59/04 | (2006.01) |
| B29C 37/00 | (2006.01) |
| B29C 59/02 | (2006.01) |

(Continued)

(52) U.S. Cl.
CPC ............ *B32B 3/30* (2013.01); *B29C 37/0028* (2013.01); *B29C 59/022* (2013.01); *B29C 59/04* (2013.01);
(Continued)

(58) Field of Classification Search
CPC ......... B32B 3/26–30; Y10T 428/24479; Y10T 428/24521; Y10T 428/24529;
(Continued)

(56) References Cited

U.S. PATENT DOCUMENTS

| 4,837,072 A | * | 6/1989 | Kraetschmer | ........... B32B 27/36 |
| | | | | 428/201 |
| 5,405,675 A | * | 4/1995 | Sawka | .................. B29C 59/026 |
| | | | | 428/195.1 |

(Continued)

FOREIGN PATENT DOCUMENTS

| JP | 2005014374 A | | 1/2005 |
| JP | 2008087267 A | * | 4/2008 |

(Continued)

OTHER PUBLICATIONS

Machine translation of JP 2013/199029 A, obtained from J-PlatPat on Jan. 20, 2019 (Year: 2019).*

(Continued)

*Primary Examiner* — Z. Jim Yang
(74) *Attorney, Agent, or Firm* — Locke Lord LLP

(57) ABSTRACT

Provided is a decorative sheet that, due to an asperity profile, creates a highly textured impression, such as a contoured impression, three-dimensional impression, impression of depth, and the like, even after being molded, and that has exceptional surface flatness. This decorative sheet has a layer that includes at least a transparent resin film layer, the layer that includes at least the transparent resin film layer having on one surface thereof an asperity profile having recesses that reach the transparent resin film layer, and includes an area in which the depth (d) of the recesses of the asperity profile, and the thickness T from the start point of the depth (d) to the surface on the opposite side from the surface that has the asperity profile in the layer that includes the transparent resin film layer, satisfy the relationship (Continued)

(d)/T×100=5-10, and is intended for use as a decorative resin molded article in which a molding resin is laminated to the surface having the asperity profile.

4 Claims, 2 Drawing Sheets

(51) Int. Cl.
    *B32B 7/12*     (2006.01)
    *B32B 27/30*     (2006.01)
    *B32B 37/12*     (2006.01)
    *B32B 37/16*     (2006.01)
    *B29L 31/00*     (2006.01)

(52) U.S. Cl.
    CPC ............... *B32B 7/12* (2013.01); *B32B 27/00* (2013.01); *B32B 27/308* (2013.01); *B32B 37/12* (2013.01); *B32B 37/16* (2013.01); *B44C 1/24* (2013.01); *B44C 3/02* (2013.01); *B29C 59/046* (2013.01); *B29C 2037/0042* (2013.01); *B29K 2995/0026* (2013.01); *B29L 2031/722* (2013.01); *B32B 2307/412* (2013.01); *B32B 2451/00* (2013.01); *Y10T 428/24529* (2015.01)

(58) Field of Classification Search
    CPC ..... Y10T 428/24537; Y10T 428/24545; Y10T 428/2457; Y10T 428/24621; Y10T 428/2462; B44C 1/24; B44C 3/02
    See application file for complete search history.

(56) References Cited

U.S. PATENT DOCUMENTS

| | | | | |
|---|---|---|---|---|
| 5,804,285 A | * | 9/1998 | Kobayashi | B32B 3/30 428/172 |
| 6,150,007 A | * | 11/2000 | Oshima | B32B 27/08 428/161 |
| 2007/0026197 A1 | * | 2/2007 | Suga | B32B 27/08 428/172 |
| 2011/0052880 A1 | * | 3/2011 | Iizuka | B32B 3/30 428/172 |
| 2015/0314327 A1 | * | 11/2015 | Shin | B32B 27/36 428/172 |
| 2016/0325535 A1 | * | 11/2016 | Ueno | B32B 27/36 |
| 2017/0151765 A1 | * | 6/2017 | Ohman | B32B 3/26 |

FOREIGN PATENT DOCUMENTS

| | | | | | |
|---|---|---|---|---|---|
| JP | 2008087267 A | | 4/2008 | | |
| JP | 2008179024 A | * | 8/2008 | | |
| JP | 2009292026 A | | 12/2009 | | |
| JP | 2010082912 A | | 4/2010 | | |
| JP | 2010089399 A | * | 4/2010 | | |
| JP | 2010234562 A | | 10/2010 | | |
| JP | 2011031437 A | | 2/2011 | | |
| JP | 2011079273 A | | 4/2011 | | |
| JP | 2011079273 A | * | 4/2011 | ............ | B29C 59/04 |
| JP | 20110079273 A | | 4/2011 | | |
| JP | 2012236574 A | * | 12/2012 | | |
| JP | 2013199029 A | * | 10/2013 | | |
| JP | 2014162126 A | | 9/2014 | | |
| JP | 2014162126 A | * | 9/2014 | ............ | B29C 59/04 |
| WO | WO-2011013659 A1 | * | 2/2011 | ........... | B29C 59/026 |

OTHER PUBLICATIONS

Machine translation of JP 2010/082912 A, obtained from J-PlatPat on Jan. 20, 2019 (Year: 2019).*

English Translation of International Search Report dated Dec. 28, 2015, issued for PCT/JP2015/077758.

Office Action dated Apr. 24, 2018, issued for Counterpart Japanese Patent Appln. No. 2014-201911.

* cited by examiner

DECORATIVE SHEET

TECHNICAL FIELD

The present invention relates to a decorative sheet having a high realistic design feeling from an irregularity shape, and excellent surface smoothness, and a decorative resin molded article obtained using the decorative sheet.

BACKGROUND ART

Decorative resin molded articles with a decorative sheet laminated on the surface of a resin molded article have been used heretofore in vehicle interior and exterior components, building interior materials, housings for home electric appliances, and the like. In production of such a decorative resin molded article, for example, a molding method is used in which a decorative sheet given a design beforehand is integrated with a resin by injection molding. Typical examples of the molding method include an insert molding method in which a decorative sheet is molded into a three-dimensional shape beforehand by a vacuum molding die, the decorative sheet is inserted into an injection molding die, and a fluidized resin is injected into the die to integrate the resin with the decorative sheet, and an injection molding simultaneous decorating method in which a decorative sheet inserted into a die in injection molding is integrated with a molten resin injected into a cavity.

In recent years, with the consumers' preference for high-grade goods, decorative resin molded articles are required to present a design having a high realistic design feeling and a high-grade feeling. Heretofore, the following technique has been reported: a decorative resin molded article obtained by providing a surface or inner part of a decorative sheet with an irregularity shape, and forming a molded resin layer on the surface provided with the irregularity shape has a high stereoscopic feeling and depth feeling based on the irregularity shape formed on the inside while having a smooth surface. As a method for providing an irregularity shape on a decorative sheet, a method is known in which embossing is performed from the top of a design layer formed on a transparent resin film to the transparent resin film side to form an irregularity shape with the design layer protruding to the transparent resin film side.

However, such a decorative sheet has the problem that an irregularity shape formed on the decorative sheet becomes gentle or small under heat and pressure during injection molding in an insert molding method etc., or during preceding premolding (vacuum molding), and thus a high realistic design feeling from the irregularity shape is impaired. The irregularity shape formed by embossing may be caused to come out to the surface under the heat and pressure during molding, leading to impairment of smoothness.

For example, in a decorative sheet disclosed in Patent Document 1, a recess formed on a design layer is filled with a resin to suppress deterioration of a realistic design feeling due to molding.

PRIOR ART DOCUMENT

Patent Document

Patent Document 1: Japanese Patent Laid-Open Publication No. 2010-82912

SUMMARY OF THE INVENTION

Problems to be Solved by the Invention

The technique disclosed in Patent Document 1 has such a superior advantage that a high realistic design feeling from an irregularity shape is retained even after molding, but in this technique, it is necessary to provide a resin layer, and thus further improvement is desired. Under these circumstances, an object of the present invention is to provide a decorative sheet having a high irregularity impression, stereoscopic feeling, depth feeling and so on, i.e. a high realistic design feeling, from an irregularity shape, and excellent surface smoothness even after molding. Further, an object of the present invention is to provide a decorative resin molded article obtained using the decorative sheet.

Means for Solving the Problem

In order to achieve the above-mentioned object, the present inventors have extensively conducted studies. Resultantly, the present inventors have devised a decorative sheet including a layer including at least a transparent resin film layer, in which the layer including the transparent resin film layer has on one surface an irregularity shape having a recess extending to the transparent resin film layer, and includes a region where a depth d of the recess in the irregularity shape and a thickness T from a start point of the depth d to a surface on a side opposite to the surface having the irregularity shape in the layer including the transparent resin film layer satisfy a relationship of $d/T \times 100 = 5$ to $10\%$, and the decorative sheet has been found to have a high irregularity impression, stereoscopic feeling, depth feeling and so on, i.e. a high realistic design feeling, from an irregularity shape, and excellent surface smoothness even after molding when the decorative sheet is used for obtaining a decorative resin molded article by laminating the surface having the irregularity shape to a molded resin. The present invention is an invention that has been completed by further conducting studies based on the above-mentioned findings.

That is, the present invention provides inventions of aspects as listed below.

Item 1. A decorative sheet including a layer including at least a transparent resin film layer, wherein the layer including the transparent resin film layer has on one surface an irregularity shape having a recess extending to the transparent resin film layer, and the layer including the transparent resin film layer includes a region where a depth d of the recess in the irregularity shape and a thickness T from a start point of the depth d to a surface on a side opposite to the surface having the irregularity shape in the layer including the transparent resin film layer satisfy a relationship of $d/T \times 100 = 5$ to $10\%$, and the decorative sheet is used for obtaining a decorative resin molded article by laminating the surface having the irregularity shape to a molded resin.

Item 2. The decorative sheet according to item 1, further including a support film layer on the surface of the layer including the transparent resin film layer, which has the irregularity shape.

Item 3. The decorative sheet according to item 2, wherein the support film layer is laminated so as to fill the recess in the irregularity shape.

Item 4. The decorative sheet according to any one of items 1 to 3, wherein the layer including the transparent resin film layer includes the transparent resin film layer and a design layer, and the recess in the irregularity shape is formed so as to extend from the design layer side to the transparent resin film layer.

Item 5. The decorative sheet according to any one of items 1 to 4, wherein the transparent film layer is formed of an acryl-based resin.

Item 6. A method for producing a decorative sheet including a layer including at least a transparent resin film layer, the layer including the transparent resin film layer having on one surface an irregularity shape having a recess extending to the transparent resin film layer, the method including:

a step of providing a sheet including a layer including at least a transparent resin film layer; and an embossing step of embossing the sheet to form an irregularity shape in which a depth d of the recess in the irregularity shape and a thickness T from a start point of the depth d to a surface on a side opposite to the surface having the irregularity shape in the layer including the transparent resin film layer satisfy a relationship of $d/T \times 100 = 5$ to 10%, the decorative sheet being used for obtaining a decorative resin molded article by laminating the surface having the irregularity shape to a molded resin.

Item 7. A method for producing a decorative sheet including a layer including at least a design layer and a transparent resin film layer, the layer including the transparent resin film layer having on one surface an irregularity shape having a recess extending to the transparent resin film layer, the method including:

a step of providing a sheet including a layer including at least a design layer and a transparent resin film layer; and an embossing step of embossing the sheet from the top of the design layer of the sheet to form an irregularity shape in which a depth d of the recess in the irregularity shape and a thickness T from a start point of the depth d to a surface on a side opposite to the surface having the irregularity shape in the layer including the design layer and the transparent resin film layer satisfy a relationship of $d/T \times 100 = 5$ to 10%, the decorative sheet being used for obtaining a decorative resin molded article by laminating the surface having the irregularity shape to a molded resin.

Item 8. A method for producing a decorative sheet including a layer including at least a transparent resin film layer, the layer including the transparent resin film layer having on one surface an irregularity shape having a recess extending to the transparent resin film layer, the method including:

a step of providing a sheet including a layer including at least a transparent resin film layer;

an embossing step of embossing the sheet to form an irregularity shape; and a step of mirror-finishing a surface of the transparent resin film layer on a side opposite to the surface provided with the irregularity shape, after the embossing step, to make an adjustment so that a depth d of the recess in the irregularity shape formed in the embossing step and a thickness T from a start point of the depth d to a surface on a side opposite to the surface having the irregularity shape in the layer including the transparent resin film layer satisfy a relationship of $d/T \times 100 = 5$ to 10%, the decorative sheet being used for obtaining a decorative resin molded article by laminating the surface having the irregularity shape to a molded resin.

Item 9. A method for producing a decorative sheet including a layer including at least a transparent resin film layer, the layer including the transparent resin film layer having on one surface an irregularity shape having a recess extending to the transparent resin film layer, the method including:

a step of providing a sheet including a layer including at least a transparent resin film layer;

an embossing step of embossing the sheet to form an irregularity shape; and a step of laminating a support film in such a manner that the recess in the irregularity shape of the sheet is filled, after the embossing step, to make an adjustment so that a depth d of the recess in the irregularity shape formed in the embossing step and a thickness T from a start point of the depth d to a surface on a side opposite to the surface having the irregularity shape in the layer including the transparent resin film layer satisfy a relationship of $d/T \times 100 = 5$ to 10%, the decorative sheet being used for obtaining a decorative resin molded article by laminating the surface having the irregularity shape to a molded resin.

Item 10. A method for producing a decorative sheet including a layer including at least a transparent resin film layer, the layer including the transparent resin film layer having on one surface an irregularity shape having a recess extending to the transparent resin film layer, the method including:

a step of providing a sheet including a layer including at least a transparent resin film layer;

an embossing step of embossing the sheet to form an irregularity shape; and a step of carrying out: the steps of laminating a support film in such a manner that the recess in the irregularity shape of the sheet is filled; and mirror-finishing a surface of the transparent resin film layer on a side opposite to the surface provided with the irregularity shape, after the embossing step, to make an adjustment so that a depth d of the recess in the irregularity shape formed in the embossing step and a thickness T from a start point of the depth d to a surface on a side opposite to the surface having the irregularity shape in the layer including the transparent resin film layer satisfy a relationship of $d/T \times 100 = 5$ to 10%, the decorative sheet being used for obtaining a decorative resin molded article by laminating the surface having the irregularity shape to a molded resin.

Item 11. A decorative resin molded article obtained by laminating the decorative sheet according to any one of items 1 to 5 to a molded resin.

Advantages of the Invention

According to the present invention, there can be provided a decorative sheet having a high irregularity impression, stereoscopic feeling, depth feeling and so on, i.e. a high realistic design feeling, from an irregularity shape, and excellent surface smoothness even after molding. Further, according to the present invention, there can be provided a decorative resin molded article obtained using the decorative sheet.

EMBODIMENTS OF THE INVENTION

1. Decorative Sheet

A decorative sheet of the present invention is a decorative sheet including a layer including at least a transparent resin film layer, in which the layer including the transparent resin film layer has on one surface an irregularity shape having a recess extending to the transparent resin film layer, and includes a region where a depth d of the recess in the irregularity shape and a thickness T from a start point of the depth d to a surface on a side opposite to the surface having the irregularity shape in the layer including the transparent resin film layer satisfy a relationship of d/T×100=5 to 10%, and the decorative sheet is used for obtaining a decorative resin molded article by laminating the surface having the irregularity shape to a molded resin. Owing to the above-mentioned configuration of the decorative sheet of the present invention, the decorative sheet has a high irregularity impression, stereoscopic feeling, depth feeling and so on, i.e. a high realistic design feeling, from an irregularity shape, and excellent surface smoothness even after molding. Hereinafter, the decorative sheet of the present invention will be described in detail.

Laminated Structure of Decorative Sheet

Figure 1:
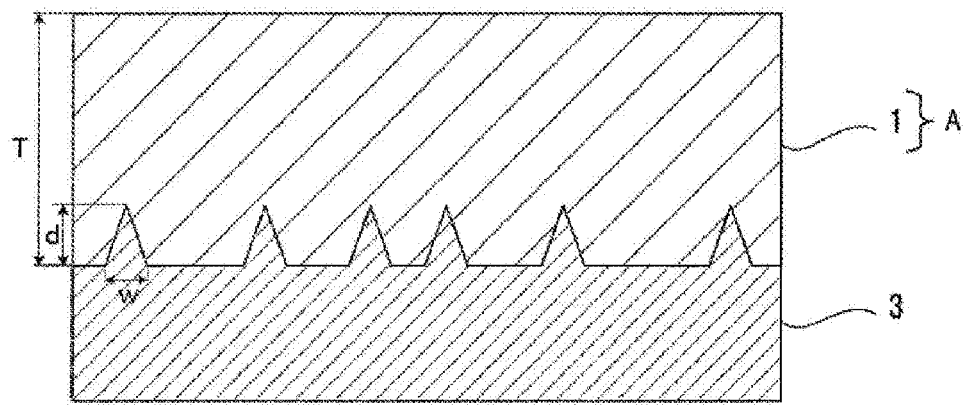
FIG. 1 is a schematic view of a cross section structure of one form of a decorative sheet according to the present invention.
Figure 2:
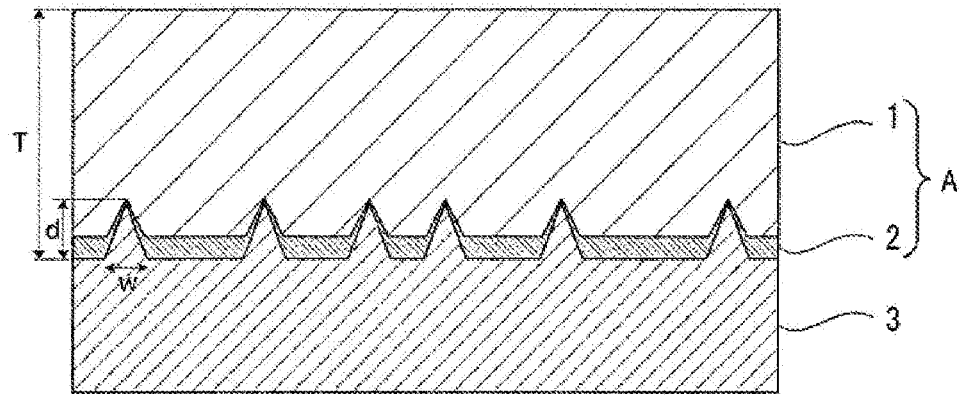
FIG. 2 is a schematic view of a cross section structure of one form of a decorative sheet according to the present invention.

As shown in FIG. 1, the decorative sheet of the present invention includes a layer including at least a transparent resin film layer 1 (hereinafter, the "layer including at least a transparent resin film layer 1" may be referred to as a "layer A"). The layer A has on one surface an irregularity shape having a recess extending to the transparent resin film layer. In the decorative sheet of the present invention, a support film 3 may be laminated as necessary on the surface of the layer A, which has the irregularity shape, for the purpose of, for example, improving the shape retainability of the decorative sheet. The support film 3 may be laminated so as to fill the recess in the irregularity shape. As described later, the whole of the recess may be filled with the support film 3, or a part of the recess may be filled, allowing a void to exist between the support film 3 and the layer A. As shown in FIG. 2, the layer A may include a design layer 2 on a surface having the irregularity shape for the purpose of, for example, improving the design property of the decorative sheet. When the layer A includes the design layer 2, the recess in the irregularity shape of the layer A is formed so as to extend from the design layer 2 side to the transparent resin film layer 1. When the layer includes the design layer 2, it is preferable that the decorative sheet of the present invention includes the transparent resin film layer 1, the design layer 2 and the support film 3 in this order. In this configuration, the layer A includes the transparent resin film layer 1 and the design layer 2.

In the decorative sheet of the present invention, an adhesive layer (not illustrated) may be provided on the back surface of the transparent resin film layer 1, the support film 3 or the design layer 2 or between the transparent resin film layer 1 or the design layer 2 and the support film 3 as necessary for the purpose of, for example, improving adhesion between the transparent resin film layer 1, the support film 3 or the design layer 2 and a molded resin layer 4 and adhesion between the transparent resin film layer 1 or the design layer 2 and the support film 3. In the present invention, when the adhesive layer is provided between the transparent resin film layer 1 or the design layer 2 and the support film 3, the adhesive layer is formed on the irregularity shape after the irregularity shape of the layer A is formed. In this case, the layer A does not include the adhesive layer.

The decorative sheet of the present invention may be composed of only the layer A having the irregularity shape, or may be a laminated body including the layer A and at least one layer of the support film 3 and the adhesive layer. The layer A may be composed of the transparent resin film layer 1 alone, or may be a laminated body including the transparent resin film layer 1 and at least one layer of the design layer 2 and the adhesive layer. Examples of the laminated structure of the decorative sheet of the present invention include a laminated structure in which a transparent resin film layer and a design layer are laminated in this order; a laminated structure in which a transparent resin film layer and a support film are laminated in this order; a laminated structure in which a transparent resin film layer, a design layer and a support film are laminated in this order; a laminated structure in which a transparent resin film layer and an adhesive layer are laminated in this order; a laminated structure in which a transparent resin film layer, a design layer and an adhesive layer are laminated in this order; a laminated structure in which a transparent resin film layer, a support film and an adhesive layer are laminated in this order; a laminated structure in which a transparent resin film layer, a design layer, a support film and an adhesive layer are laminated in this order; and a laminated structure in which a transparent resin film layer, a design layer, an adhesive layer and a support film are laminated in this order. As one aspect of the laminated structure of the decorative sheet according to the present invention, FIG. 1 shows a schematic view of a cross section structure of one form of a decorative sheet in which a transparent resin film layer and a support film are laminated in this order. As one aspect of the laminated structure of the decorative sheet according to the present invention, FIG. 2 shows a schematic view of a cross section structure of one form of a decorative sheet in which a transparent resin film layer, a design layer and a support film are laminated in this order.

Irregularity Shape of Decorative Sheet

The decorative sheet of the present invention includes the layer A. The layer A has on one surface an irregularity shape having a recess extending to the transparent resin film layer 1, and includes a region where a depth d of the recess in the irregularity shape and a thickness T from the start point of the depth d to a surface on a side opposite to the surface having the irregularity shape in the layer including the transparent resin film layer 1 satisfy the relationship of d/T×100=5 to 10%. In the decorative sheet of the present invention, an irregularity shape that satisfies the above-mentioned specific relationship is formed, and thus the decorative sheet has a high irregularity impression, stereoscopic feeling, depth feeling and so on, i.e. a high realistic design feeling, from an irregularity shape, and excellent surface smoothness even after molding. The value of d/T× 100 is more preferably 5 to 8%. In the present invention, the thickness T and the depth d of the recess are each measured by observing a cross section of the decorative sheet with an optical microscope. The depth d of the recess is an average of the depths of 10 continuous recesses.

The decorative sheet of the present invention can also be expected to exhibit an effect of suppressing occurrence of cracking caused by a load or bending because the depth d and the thickness T satisfy the above-mentioned relationship. In a decorative sheet with an irregularity shape provided on a transparent resin film layer, the flexibility of the transparent resin film layer having a reduced thickness in a recess is impaired, so that cracking easily occurs with the recess as an original point. When the recess is deepened for improving the irregularity impression, the above-mentioned tendency becomes evident. In this regard, it is considered that in the decorative sheet of the present invention, the depth d and the thickness T satisfy the above-mentioned relationship, and thus the transparent resin film layer maintains flexibility, so that the decorative sheet has an excellent irregularity impression while occurrence of cracking of the decorative sheet is suppressed.

When the layer A including at least the transparent resin film layer 1 is composed of the transparent resin film layer 1 alone, the irregularity shape is formed to extend from one surface to the other surface of the transparent resin film layer 1 as shown in FIG. 1. The thickness T corresponds to the thickness of the transparent resin film layer 1, and the depth d corresponds to the depth d of the recess formed on the transparent resin film layer 1. FIG. 1 shows an aspect in which the decorative sheet of the present invention is composed of the layer A and the support film 3.

When the layer A including at least the transparent resin film layer 1 includes the design layer 2, the transparent resin film layer 1 and the design layer 2 are laminated on the layer A, and the recess in the irregularity shape is formed so as to extend from the design layer 2 side to the transparent resin film layer 1 as shown in FIG. 2. In this case, the thickness T corresponds to the total thickness of the transparent resin film layer 1 and the design layer 2, and the depth d corresponds to the depth d of the recess formed so as to extend to the transparent resin film layer 1 from a surface of the design layer 2 which is provided with the irregularity shape. FIG. 2 shows an aspect in which the decorative sheet of the present invention is composed of the layer A and the support film 3.

In the decorative sheet of the present invention, the thickness T is preferably about 30 to 300 μm, more preferably about 100 to 200 μm. The depth d is preferably about 5 to 100 μm, more preferably about 8 to 60 μm.

In the decorative sheet of the present invention, the width w of the recess on a surface of the layer A which is provided with the irregularity shape is not particularly limited, but it is preferably about 10 to 100 μm, more preferably about 20 to 40 μm for exhibiting a high irregularity impression, stereoscopic feeling, depth feeling and so on, i.e. a high realistic design feeling, from an irregularity shape, and excellent surface smoothness even after molding. From the same point of view, the cycle width (pitch) of the irregularity shape is preferably about 10 to 100 μm, more preferably about 20 to 40 μm. When the cycle width (pitch) of the irregularity shape falls within the above-mentioned range, excellent shapability and design property can be obtained. In the present invention, the width w of the recess and the cycle width of the irregularity shape are each measured by observing a cross section of the decorative sheet with an optical microscope. Each of these values is an average for 10 continuous recesses and irregularity shapes.

In the decorative sheet of the present invention, the irregularity shape may be formed in at least a partial region to which a high realistic design feeling is imparted from the irregularity shape in observation of the decorative sheet from a surface (surface on a side opposite to a surface provided with the irregularity shape). In other words, in the decorative sheet of the present invention, an irregularity shape that satisfies the above-mentioned relationship may be formed in a partial region, or formed in the whole region.

Compositions of Layers Forming Decorative Sheet

[Transparent Resin Film Layer 1]

In the decorative sheet of the present invention, the transparent resin film layer 1 is a layer which is included in the layer A, and usually provided so as to be situated on the outermost surface of a decorative resin molded article. For improving the moldability of the decorative sheet of the present invention, the material of the transparent resin film layer 1 is preferably a thermoplastic resin. Since a decorative resin molded article obtained using the decorative sheet of the present invention is observed from the transparent resin film layer 1 side, the transparent resin film layer 1 is required to have transparency for presenting a high realistic design feeling from an irregularity shape as described later. The transparency mentioned here also includes semi-transparency that allows the irregularity shape to be viewed through the transparent resin film layer 1.

The transparent resin film layer 1 has an irregularity shape on one surface. As described later, the irregularity shape is formed by embossing. When the layer A is formed of the transparent resin film layer 1 alone in the decorative sheet of the present invention, the irregularity shape of the layer A corresponds to the irregularity shape of the transparent resin film layer 1.

The thermoplastic resin to be used in the transparent resin film layer 1 is preferably an acryl-based resin, a vinyl chloride resin, an ABS resin (acrylonitrile-styrene-butadiene copolymer), a styrene resin, a polycarbonate resin, a polyester resin such as polyethylene terephthalate or a moldable polyester resin, a polyolefin-based resin such as polyethylene, polypropylene, polymethylpentene, polybutene, an ethylene-propylene copolymer, a propylene-butene copolymer or an olefin-based thermoplastic elastomer, or the like. Among them, an acryl-based resin and a polyester resin are more preferable, with the acryl-based resin being especially preferable. The thermoplastic resins may be used alone, or may be used in combination of two or more thereof.

As the acryl-based resin, for example, acryl-based resins such as polymethyl(meth)acrylates, polybutyl(meth)acrylates, methyl(meth)acrylate-butyl(meth)acrylate copolymers and methyl(meth)acrylate-styrene copolymers are used alone, or in combination of two or more thereof. In the present invention, the (meth)acrylate means an acrylate or a methacrylate.

As the polyester resin, a polyester-based thermoplastic elastomer, a non-crystalline polyester or the like can be used. Examples of the polyester-based thermoplastic elastomer include block polymers in which a high-crystallinity and high-melting-point aromatic polyester is used as a hard segment, and a non-crystalline polyether having a glass transition temperature of −70° C. or lower, etc. is used as a soft segment. As the high-crystallinity and high-melting-point aromatic polyester, for example, polybutylene terephthalate is used, and as the non-crystalline polyether, polytetramethylene glycol or the like is used. Typical examples of the non-crystalline polyester include ethylene glycol-1,4-cyclohexanedimethanol-terephthalic acid copolymers.

As the transparent resin film layer 1, for example, a single-layer or multi-layered resin film composed of resins as described above can be used. The transparent resin film layer 1 may appropriately contain various kinds of additives such as a stabilizer, a plasticizer, a colorant, an ultraviolet absorber, a hindered amine-based light stabilizer and an extender pigment as necessary for adjustment of physical properties. These additives may be used alone, or may be used in combination of two or more thereof. The transparent resin film layer 1 may be colored within the bounds of not impairing transparency. For coloring the transparent resin film layer 1, for example, a known colorant as shown later as an example in connection with the design layer 2.

The thickness of the transparent resin film layer 1 (the total thickness in the case of multiple layers) is not particularly limited, but it is preferably about 30 to 300 µm, more preferably about 100 to 200 µm from the viewpoint of costs, performance required for a decorative resin molded article, moldability of a decorative sheet, and so on. The thickness of the transparent resin film layer 1 is the thickness of a portion of the irregularity shape in which a recess is not formed.

The surface, the back surface or both the surfaces of the transparent resin film layer 1 may be appropriately subjected to a known easy-adhesive treatment such as a corona discharge treatment, a plasma treatment, or primer layer formation with a urethane resin etc. as necessary for improving adhesion with other layers that are in contact with the transparent resin film layer 1.

[Design Layer 2]

In the decorative sheet of the present invention, the design layer 2 is a layer that is provided on the layer A as necessary for imparting a high realistic design feeling from the irregularity shape to the decorative sheet. When the layer A includes the design layer 2, the recess in the irregularity shape is formed so as to extend from the design layer 2 side to the transparent resin film layer 1 in the layer A. In other words, the design layer 2 is a layer that is laminated along the irregularity shape of the transparent resin film layer 1. As described above, when the decorative sheet includes the design layer 2, the irregularity shape of the layer A is formed in such a manner that the recess extends from one surface of the design layer 2 to the transparent resin film layer 1 by, for example, performing embossing from the top of the design layer 2 of a sheet in which the transparent resin film layer 1 and the design layer 2 are laminated. As shown in, for example, FIG. 2, the design layer 2 is laminated along the irregularity shape of the transparent resin film layer 1, and the design layer 2 fills a part of the recess in the irregularity shape of the transparent resin film layer 1. The surface on a side opposite to the transparent resin film layer 1 of the design layer 2 has a recess.

The design layer 2 can be formed from a pattern layer and/or a solid printing layer. The picture of the pattern layer is not particularly limited, and for example, woody textures, pebble-like textures, cloth-like textures, sand-like textures, leather drawing patterns, tiling patterns, brick masonry patterns, geometrical patterns, characters, symbols and so on are used alone or in combination of two or more thereof.

The design layer 2 can be formed by applying an ink for formation of a design layer to the transparent resin film layer 1 and performing printing. The ink for formation of a design layer includes a binder resin, a colorant such as a pigment or a dye, and various kinds of additives appropriately added thereto. Examples of the binder resin include acrylic resins, vinyl chloride-vinyl acetate copolymers, polyester resins, cellulose-based resins, chlorinated polypropylene, urethane resins and polyamide resins. A one selected from the above mentioned resins, or a mixture of two or more of the resins is used. The binder resins may be used alone, or may be used in combination of two or more thereof.

As the colorant, for example, an inorganic pigment such as titanium white, zinc white, carbon black, iron black, rouge, chrome vermilion, cadmium red, ultramarine, cobalt blue, yellow zinc or titanium yellow, an organic pigment (including a dye) such as phthalocyanine blue, indanthrene blue, isoindolinone yellow, benzidine yellow, quinacridone red, polyazo red or perylene red, a metallic pigment composed of a scale-like foil powder of aluminum, brass or the like, or pearlescent (pearl) pigment composed of a scale-like foil powder of titanium dioxide-coated mica, basic lead carbonate or the like is used. The colorants may be used alone, or may be used in combination of two or more thereof.

Specific examples of the design layer 2 include metallic-color solid printing layers.

The design layer 2 can be formed by applying an ink for formation of a design layer onto the transparent resin film layer 1 using a printing method such as gravure printing, silk screen printing or offset printing, or a known coating method such as roll coating.

The thickness of the design layer 2 is not particularly limited, but it is preferably about 0.5 to 20 µm, more preferably about 1 to 10 µm.

The design layer 2 may be a thin metal film layer. Examples of the metal for forming the thin metal film layer include tin, indium, chromium, aluminum, nickel, copper, silver, gold, platinum, zinc and an alloy containing at least one of these metals. The method for forming a thin metal film layer is not particularly limited, and examples thereof include a vapor deposition method such as a vacuum vapor deposition method, a sputtering method and an ion plating method each using the above-mentioned metal. The thickness of the design layer 2 (thin metal film layer) is not particularly limited, but it is preferably about 0.6 to 1.8, more preferably about 0.8 to 1.5 in terms of an optical density (OD value) for improving the design property and moldability of the decorative sheet. For improving adhesion with the adjacent layer, the surface or back surface of the thin metal film layer may be provided with a primer layer using a known resin. In the present invention, the thickness of the design layer 2 is the thickness of a portion of the irregularity shape in which a recess is not formed.

[Support Film 3]

In the decorative sheet of the present invention, the support film 3 is a layer that is provided as necessary on a surface of the layer A which has the irregularity shape. The support film 3 serves as a support member. Specifically, the support film 3 is laminated on a surface of the transparent resin film layer 1 or design layer 2 which has the irregularity shape. Preferably, the decorative sheet of the present invention includes the support film 3 when used for production of a decorative resin molded article by an insert molding method as described later.

The material of the support film 3 is not particularly limited, and examples thereof include ABS resins, polyolefin resins, styrene resins, (meth)acrylic resins, vinyl chloride resins and polycarbonate resins. The polyolefin resin is preferably a polypropylene resin. Among these resins, ABS resins and polypropylene resins are especially preferable. The ABS resin is preferable when the molding resin that forms the molded resin layer 4 is the ABS resin, and the polypropylene resin is preferable when the molding resin is the polypropylene resin.

As shown in FIG. 1 or FIG. 2, the support film 3 may be laminated so as to fill the recess in the irregularity shape of the layer A in the decorative sheet of the present invention. Specifically, when the layer A is composed of only the transparent resin film layer 1, the support film 3 may be laminated so as to fill the recess in the irregularity shape of the transparent resin film layer 1. When the decorative sheet includes the design layer 2, the support film 3 may be laminated so as to fill the recess in the irregularity shape of the design layer 2. Examples of the method for filling the recess with the support film 3 include a method in which the support film 3 is heated to be softened, and is then laminated on a surface provided with the irregularity shape.

When the support film 3 fills the recess on the layer A, the whole of the recess may be filled with the support film 3, or a part of the recess may be filled, allowing a void to exist between the support film 3 and the layer A.

The thickness of the support film 3 is not particularly limited, but it is, for example, about 0.1 to 0.5 mm, more preferably about 0.2 to 0.4 mm. The thickness of the support film 3 is the thickness of a portion that does not fill the recess in the irregularity shape.

[Adhesive Layer]

In the decorative sheet of the present invention, an adhesive layer may be provided on the back surface of the transparent resin film layer 1, the design layer 2 or the support film 3 or between the transparent resin film layer 1 or the design layer 2 and the support film 3 as necessary for the purpose of, for example, improving adhesion between the transparent resin film layer 1, the design layer 2 or the support film 3 and the molded resin layer 4 and adhesion between the transparent resin film layer 1 or the design layer 2 and the support film 3.

In the present invention, when the adhesive layer is provided between the transparent resin film layer 1 or the design layer 2 and the support film 3, the adhesive layer is formed on the irregularity shape after the irregularity shape of the layer A is formed as described above. In this case, the layer A includes the adhesive layer.

Examples of the material of the adhesive that forms the adhesive layer include two-liquid curable urethane resins with isocyanate as a curing agent, chlorinated polyolefins such as chlorinated polypropylene, (meth)acrylic resins, vinyl chloride-vinyl acetate copolymers, and mixtures of a (meth)acrylic resin and a vinyl chloride-vinyl acetate copolymer. As the (meth)acrylic resin or vinyl chloride-vinyl acetate copolymer in the adhesive layer, one that is the same as that in the design layer 2 may be used. When the support film 3 is made of an ABS resin or polyolefin resin, it is preferable that a two-liquid curable urethane resin with isocyanate as a curing agent, a chlorinated polyolefin such as chlorinated polypropylene, or the like is used in the adhesive layer.

The adhesive layer can be formed by applying the above-described adhesive using a known printing or coating method such as gravure printing or roll coating. The thickness of the adhesive layer is not particularly limited, and it is normally about 1 to 50 μm.

Embossing

In the decorative sheet of the present invention, the irregularity shape can be formed by embossing. Specifically, a sheet including the layer A including at least the transparent resin film layer 1 is provided, and the sheet is embossed to form an irregularity shape having a recess extending to the transparent resin film layer 1. By the embossing, an irregularity shape can be formed in which the depth d of the recess in the irregularity shape formed on the layer A and the thickness T from the start point of the depth d to a surface on a side opposite to the surface having the irregularity shape in the layer A satisfy the relationship of $d/T \times 100 = 5$ to 10%.

As a method for performing embossing, an embossing method by heating and pressing is normally used. The embossing method by heating and pressing is a method in which a surface of a sheet is heated and softened, and pressed with an embossing plate to give an irregularity pattern of the embossing plate to the surface of the sheet, and the sheet is cooled to fix the pattern. The shape of the embossing plate to be used in embossing corresponds to the irregularity shape formed on the layer A. For embossing, for example, a known sheet-type or rotary embossing machine can be used.

When the layer A includes the design layer 2, the embossing method by heating and pressing is classified into a method in which the top of the design layer 2 is embossed, and a method in which the design layer 2 is applied so as to follow an irregularity shape from above the irregularity shape of the transparent resin film layer 1 provided with the irregularity shape. For example, in embossing, an embossing plate reaches from the design layer 2 to the transparent resin film layer 1, so that a recess extending to the transparent resin film layer 1 can be formed. Specifically, a sheet including at least the design layer 2 and the transparent resin film layer 1 is provided, and embossing is performed from above the design layer 2 to form a region in which the depth d of the recess and the thickness T satisfy the relationship of $d/T \times 100 = 5$ to 10%.

The depth d of the recess provided by embossing (see FIG. 1 and FIG. 2) is preferably about 5 to 100 μm, more preferably about 8 to 60 μm for retaining a high realistic design feeling from the irregularity shape after molding of the decorative sheet.

The heating temperature in embossing is not particularly limited, but it is preferably about 180° C. to 220° C.

The relationship between the depth d of the recess and the thickness T may be adjusted after embossing. For example, after the embossing step, a surface of the transparent resin film layer 1 can be mirror-finished to make an adjustment so that the depth d of the recess formed in the embossing step and the thickness T from the surface having an irregularity shape to the surface of the transparent resin film layer in the decorative sheet satisfy the relationship of $d/T \times 100 = 5$ to 10%. The adjustment of d/T by mirror-finishing may be made when the irregularity shape does not satisfy the relationship of $d/T \times 100 = 5$ to 10% in the embossing, or may be made when the irregularity shape satisfies this relationship.

The mirror-finishing of the surface of the transparent resin film layer 1 can be performed using a mirror-finished roller etc. Specifically, the mirror-finishing can be performed by applying heat and pressure to the embossed sheet by causing the sheet to pass between a heated mirror-finished roller and a rubber roller. The mirror-finished roller is pressed against the surface of the transparent resin film layer 1, and the back surface of the sheet is pressed with the rubber sheet. As the mirror-finished roller, a metallic roller obtained by, for example, plating the surface of an iron core etc. with chromium to mirror-finish the surface, or the like can be used, and as the rubber roller, a roller obtained by covering the surface of an iron core etc. with a rubber such as silicone rubber. By pressing the mirror-finished roller against the sheet, the thickness T and the depth d just after formation of the irregularity shape by embossing can be changed to make an adjustment so that the relationship of $d/T \times 100 = 5$ to 10% is satisfied. When the relationship of $d/T \times 100 = 5$ to 10% is satisfied in the embossing, mirror-finishing may be performed in such a manner that the relationship of d/T is not substantially changed.

Excellent mirror-finishing property can be imparted to the front surface of the transparent resin film layer 1 by mirror-finishing. The mirror-finishing property is preferably 1 μm or less, more preferably 0.1 μm or less in terms of the arithmetic mean roughness Ra in JIS B0601 (1996). In other words, the mirror-finished surface is a surface, the arithmetic mean roughness Ra of which is preferably 1 μm or less, more preferably 0.1 μm or less.

In the present invention, by laminating the support film 3 so as to fill the recess in the irregularity shape of the sheet after the embossing step, an adjustment can be made so that the depth d of the recess formed in the embossing step and the thickness T from the surface having the irregularity shape to the surface of the transparent resin film layer 1 in the decorative sheet satisfy the relationship of d/T×100=5 to 10%. The method for laminating the support film 3 so as to fill the recess with the support film 3 is as described above. The adjustment of d/T by laminating the support film 3 may be made when the irregularity shape does not satisfy the relationship of d/T×100=5 to 10% in the embossing, or may be made when the irregularity shape satisfies this relationship. When the relationship of d/T×100=5 to 10% is satisfied in the embossing, the support film 3 may be laminated in such a manner that the relationship of d/T is not substantially changed.

Further, in the present invention, by performing both the mirror-finishing and the lamination of the support film 3 after embossing, an adjustment can be made so that the relationship of d/T×100=5 to 10% is satisfied. Specifically, by carrying out the steps: of laminating a support film so as to fill the recess in the irregularity shape of the sheet; and mirror-finishing a surface on a side opposite to a surface of the transparent resin film layer 1 which is provided with the irregularity shape, after the embossing step, an adjustment can be made so that the depth d of the recess in the irregularity shape formed in the embossing step and the thickness T from the start point of the depth d to a surface on a side opposite to the surface having the irregularity shape in the layer A including the transparent resin film layer 1 satisfy the relationship of d/T×100=5 to 10%. When both the mirror-finishing and the lamination of the support film 3 are performed, the order thereof is not particularly limited, but it is preferable to perform mirror-finishing after laminating the support film 3 for protecting a mirror-finished surface formed by the mirror-finishing.

2. Decorative Resin Molded Article

Figure 3:
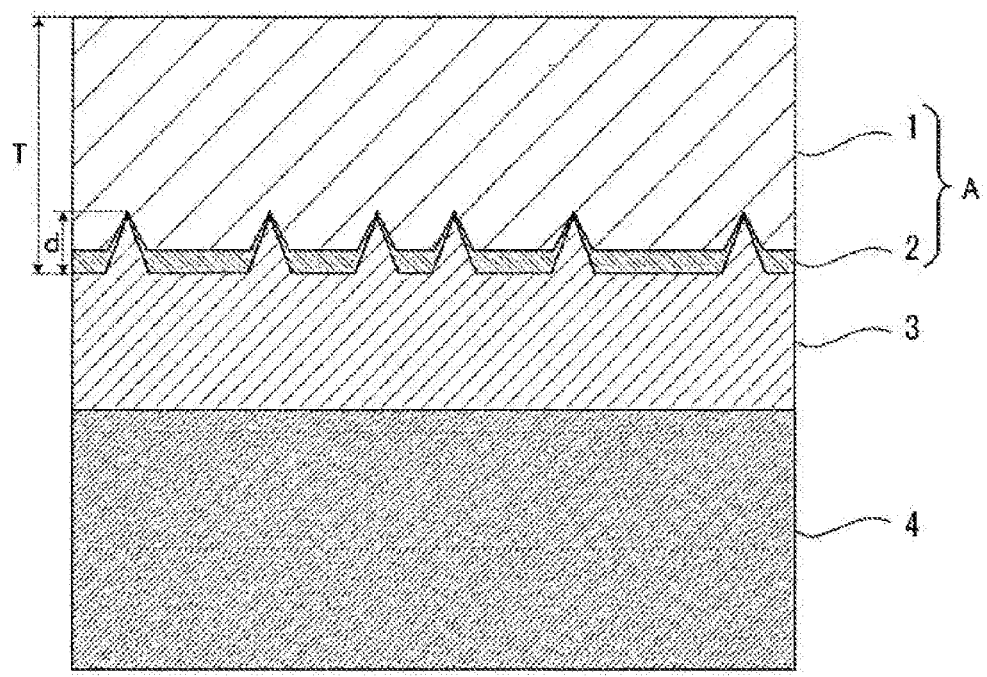
FIG. 3 is a schematic view of a cross section structure of one form of a decorative resin molded article according to the present invention.

The decorative resin molded article of the present invention is formed by integrating a molded resin with the decorative sheet of the present invention. That is, the decorative resin molded article of the present invention includes a laminated body in which at least a molded resin layer 4 and a layer A including at least a transparent resin film layer 1 are laminated in this order (see FIG. 3), the layer A having on one surface an irregularity shape having a recess extending to the transparent resin film layer 1. In the decorative resin molded article of the present invention, a design layer 2, a support film 3 and so on may be further provided between the transparent resin film layer 1 and the molded resin layer 4 as necessary as shown in FIG. 3. The above-mentioned adhesive layer may be provided.

For example, the decorative resin molded article of the present invention is prepared by various injection molding methods such as an insert molding method, an injection molding simultaneous decorating method, a blow molding method and a gas injection molding method using the decorative sheet of the present invention. Among these injection molding methods, an insert molding method and an injection molding simultaneous decorating method are preferable. The decorative resin molded article of the present invention can also be prepared by a decoration method in which the decorative sheet of the present invention is bonded onto a previously provided three-dimensional resin molded body (molded resin layer), such as a vacuum press-bonding method.

In the insert molding method, first the decorative sheet of the present invention is vacuum-molded into a molded article surface shape beforehand using a vacuum molding die (off-line preliminary molding) in a vacuum molding step, and then an unnecessary portion is trimmed off as necessary to obtain a molded sheet. The molded sheet is inserted into an injection molding die, the injection molding die is closed, a fluidized resin is injected into the die, and solidified to integrate the decorative sheet with the outer surface of the resin molded body in parallel to injection molding, thereby producing a decorative resin molded article.

More specifically, the decorative resin molded article of the present invention is produced by an insert molding method including:

a vacuum molding step of molding the decorative sheet of the present invention into a three-dimensional shape beforehand by a vacuum molding die;

a trimming step of trimming off an unnecessary portion of the vacuum-molded decorative sheet to obtain a molded sheet; and an integration step of inserting the molded sheet into an injection molding die, closing the injection molding die, and injecting a fluidized resin into the injection molding die to integrate the resin with the molded sheet.

In the vacuum molding step in the insert molding method, the decorative sheet may be heated and molded. The heating temperature here is not particularly limited, and may be appropriately selected according to a type of the resin that forms the decorative sheet, or a thickness of the decorative sheet, and it may be normally about 100 to 250° C., preferably about 130 to 200° C. In the integration step, the temperature of the fluidized resin is not particularly limited, but it may be normally about 180 to 320° C., preferably about 220 to 280° C.

In the injection molding simultaneous decorating method, the decorative sheet of the present invention is disposed in a female die also serving as a vacuum molding die provided with a suction hole for injection molding, and is subjected to preliminary molding in this female die (in-line preliminary molding), the injection molding die is then closed, a fluidized resin is injected and filled into the die, and solidified to integrate the decorative sheet of the present invention with the outer surface of the resin molded body in parallel to injection molding, thereby producing a decorative resin molded article.

More specifically, the decorative resin molded article of the present invention is produced by an injection molding simultaneous decorating method including:

a preliminary molding step of placing the decorative sheet of the present invention in such a manner that a surface of the decorative sheet on a side opposite to the transparent resin film layer 1 faces a molding surface of a movable die, the molding surface having a predetermined shape, then heating and softening the decorative sheet, and vacuum-suctioning the decorative sheet from the movable die side to adhere the softened decorative sheet along the molding surface of the movable die, thereby preliminarily molding the decorative sheet;

an integration step of closing the movable die having the decorative sheet adhered along the molding surface, and a fixed die, then injecting and filling a fluidized resin into a cavity formed by both the dies, solidifying the resin to form a resin molded body, and laminating and integrating the resin molded body and the decorative sheet with each other; and a taking-out step of separating the movable die from the fixed die to take out the resin molded body with all the layers of the decorative sheet laminated thereon.

In the preliminary molding step of the injection molding simultaneous decorating method, the heating temperature of the decorative sheet is not particularly limited, and may be appropriately selected according to a type of the resin that forms the decorative sheet, or a thickness of the decorative sheet, and it may be normally about 70 to 130° C. In the injection molding step, the temperature of the fluidized resin is not particularly limited, but it may be normally about 180 to 320° C., preferably about 220 to 280° C.

In the vacuum press-bonding method, first the decorative sheet of the present invention and a resin molded body are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and that a side of the decorative sheet, which is opposite to the transparent resin film layer 1, faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is abutted against the decorative sheet with the lift table, and by using a pressure difference between the two vacuum chambers, the decorative sheet is bonded to the surface of the resin molded body while being stretched. Finally, the two vacuum chambers are released to atmospheric pressure, and an unnecessary portion of the decorative sheet is trimmed off, so that the decorative resin molded article of the present invention can be obtained.

Preferably, the vacuum press-bonding method includes a step of heating the decorative sheet for softening the decorative sheet to improve the moldability thereof before the step of abutting the molded body against the decorative sheet. The vacuum press-bonding method including such a step may be referred to particularly as a vacuum heating and press-bonding method. The heating temperature in the step may be appropriately selected according to a type of the resin that forms the decorative sheet, or a thickness of the decorative sheet, and it may be normally about 60 to 200° C.

When trimming is performed in a molding method such as an insert molding method or a vacuum press-bonding method, a conventional decorative sheet having an irregularity shape is easily cracked at the time of performing trimming, but the decorative sheet of the present invention in which the depth d and the thickness T satisfy the specific relationship in terms of d/T as described above is inhibited from being cracked by a load and bending, and therefore when the decorative sheet of the present invention is used in the above-mentioned molding method, the decorative sheet can be effectively inhibited from being cracked in trimming.

In the decorative resin molded article of the present invention, a resin appropriate to an intended use may be selected to form the molded resin layer. The resin that forms the molded resin layer may be either a thermoplastic resin or a thermosetting resin.

Specific examples of the thermoplastic resin include polyolefin-based resins such as polyethylene and polypropylene, ABS resins, styrene resins, polycarbonate resins, acrylic resins and vinyl chloride-based resins. These thermoplastic resins may be used alone, or may be used in combination of two or more thereof.

Examples of the thermosetting resin include urethane resins and epoxy resins. These thermosetting resins may be used alone, or may be used in combination of two or more thereof.

The decorative resin molded article of the present invention has a high irregularity impression, stereoscopic feeling, depth feeling and so on, i.e. a high realistic design feeling, from an irregularity shape, and high surface smoothness. Therefore, the decorative resin molded article of the present invention can be used for, for example, interior materials or exterior materials of vehicles such as automobiles; fittings such as window frames and door frames; interior materials of buildings such as walls, floors and ceilings; housings of household electric appliances such as television receivers and air conditioners; and containers etc.

EXAMPLES

Hereinafter, the present invention will be described in detail by way of examples and comparative examples. However, the present invention is not limited to examples.

Example 1

A design layer (thickness: 1 μm) composed of a polybutyl methacrylate/vinyl chloride-vinyl acetate copolymer is laminated on the back surface of a transparent resin film layer including a 150 μm-thick colorless and transparent acrylic resin sheet mainly composed of polymethyl methacrylate. Next, the top of the design layer was embossed using an embossing plate having a plate depth of 30 μm, so that an irregularity shape was formed. Next, a 300 μm-thick support film (black ABS resin) was attached to a surface provided with the irregularity shape. Next, a cross-section of the obtained decorative sheet was observed with a microscope, and the thickness (total thickness of the transparent resin film layer and the design layer) T from a surface of the design layer, which had the irregularity shape, to the surface of the transparent resin film layer, and the depth d of the recess were measured. The results are shown in Table 1. The depth d of the recess is an average of the depths of 10 continuous recesses observed with the microscope. The decorative sheet prepared as described above was placed in a vacuum-molding machine ("VPF-T1" manufactured by Fu-se Vacuum Forming Ltd.), and heated by heater until the surface temperature reached 160° C., and the decorative sheet was vacuum-molded. The resulting vacuum-molded article was taken out from the vacuum-molding machine, and trimmed, and the support film layer side was then integrated with a molded resin to obtain a decorative resin molded article. As the molded resin, a mixture of polycarbonate and an ABS resin (trade name: CYCOLOY IP 1000BK manufactured by GE Plastics Company) was used.

Example 2

Except that a transparent resin film layer including a 125 μm-thick colorless and transparent acrylic resin sheet mainly composed of polymethyl methacrylate was used, and embossing was performed using an embossing plate having a plate depth of 20 μm, the same procedure as in Example 1 was carried out to produce a decorative sheet and a decorative resin molded article. Next, a cross-section of the obtained decorative sheet was observed with a microscope, and the thickness (total thickness of the transparent resin film layer and the design layer) T from a surface of the design layer, which had the irregularity shape, to the surface of the transparent resin film layer, and the depth d of the recess were measured in the same manner as in Example 1. The results are shown in Table 1.

Example 3

Except that a transparent resin film layer including a 125 μm-thick colorless and transparent acrylic resin sheet mainly composed of polymethyl methacrylate was used, and embossing was performed using an embossing plate having a plate depth of 40 μm, the same procedure as in Example 1 was carried out to complete steps up to the support film laminating step. Next, a surface on the transparent resin film side was mirror-finished to produce a decorative sheet and a decorative resin molded article. Next, a cross-section of the obtained decorative sheet was observed with a microscope, and the thickness (total thickness of the transparent resin film layer and the design layer) T from a surface of the design layer, which had the irregularity shape, to the surface of the transparent resin film layer, and the depth d of the recess were measured in the same manner as in Example 1. The results are shown in Table 1.

Comparative Example 1

Except that a transparent resin film layer including a 125 μm-thick colorless and transparent acrylic resin sheet mainly composed of polymethyl methacrylate was used, and embossing was performed using an embossing plate having a plate depth of 40 μm, the same procedure as in Example 1 was carried out to produce a decorative sheet and a decorative resin molded article. Next, a cross-section of the obtained decorative sheet was observed with a microscope, and the thickness (total thickness of the transparent resin film layer and the design layer) T from a surface of the design layer, which had the irregularity shape, to the surface of the transparent resin film layer, and the depth d of the recess were measured in the same manner as in Example 1. The results are shown in Table 1.

Comparative Example 2

Except that a transparent resin film layer including a 125 μm-thick colorless and transparent acrylic resin sheet mainly composed of polymethyl methacrylate was used, and embossing was performed using an embossing plate having a plate depth of 10 μm, the same procedure as in Example 1 was carried out to produce a decorative sheet and a decorative resin molded article. Next, a cross-section of the obtained decorative sheet was observed with a microscope, and the thickness (total thickness of the transparent resin film layer and the design layer) T from a surface of the design layer, which had the irregularity shape, to the surface of the transparent resin film layer, and the depth d of the recess were measured in the same manner as in Example 1. The results are shown in Table 1.

(Evaluation of Surface Smoothness)

The decorative sheets and decorative resin molded articles obtained as described above were each provided as a test sample, and placed on a horizontal surface under a white light fluorescent lamp. Next, the test sample was visually observed at a distance of about 50 cm from the test sample and in the directions of 45°, 60° and 90° (upright direction), and surface smoothness was evaluated. The surface was touched with a hand to evaluate surface smoothness. The evaluation criteria are as follows.

⊚: Surface irregularities were not observed at any of the angles, and surface irregularities were not sensed when the surface touched with a hand.

○: Surface irregularities were not observed at 90°, while surface irregularities were observed at 45° and 60°. Surface irregularities were not sensed when the surface was touched with a hand.

Δ: Surface irregularities were observed at all the angles, but surface irregularities were not sensed when the surface touched with a hand.

x: Surface irregularities were observed at all the angles, and surface irregularities were sensed when the surface touched with a hand.

(Stereoscopic Design Effect)

The decorative sheets and decorative resin molded articles obtained as described above were each provided as a test sample, and placed on a horizontal surface under a white light fluorescent lamp. Next, the test sample was visually observed at a distance of about 50 cm from the test sample and in the directions of 45°, 60° and 90° (upright direction), and the stereoscopic design effect was evaluated in accordance with the following evaluation criteria. The evaluation criteria are as follows.

⊚: The sample displayed a stereoscopic design at all angles, and its shape was as sharp as the embossing plate shape.

○: The sample displayed a stereoscopic design at all angles, but its shape was slightly poorer in sharpness as compared to the embossing plate shape.

Δ: The sample exhibited a slightly low stereoscopic feeling at 90°, but exhibited a deep design feeling at 45° and 60°.

x: The sample was flat at all the angles, and did not exhibit a stereoscopic design at all.

(Cracking of Decorative Sheet)

The decorative sheet obtained as described above was cut to a size of 30 mm×30 mm to obtain a test sample. Next, a surface having a shape of R=1 mm or R=0 mm (pin angle) was pressed against a surface of the transparent resin film surface under a load of 5 kg, and cracking of a surface of the decorative sheet was evaluated. Further, each test sample was rapidly bent with hands, and cracking of a surface of the decorative sheet was evaluated. The evaluation criteria for cracking are as follows.

⊚: Cracking on a surface of the decorative sheet is not observed at R=0, and the decorative sheet is not cracked when rapidly bent with hands.

○: Cracking on a surface of the decorative sheet is not observed at R=0, but the decorative sheet is cracked when rapidly bent with hands.

Δ: Cracking on a surface of the decorative sheet is not observed at R=1, but the decorative sheet is cracked when rapidly bent with hands.

x: Cracking on a surface of the decorative sheet is observed at R=1, and the decorative sheet is cracked when rapidly bent with hands.

TABLE 1

|  | Example 1 | Example 2 | Example 3 | Comparative Example 1 | Comparative Example 2 |
|---|---|---|---|---|---|
| Depth d of recess (μm) | 13 | 8 | 10 | 27 | 5 |
| Thickness T from surface of design layer which has irregularity shape to surface of transparent resin film layer (μm) | 149 | 135 | 128 | 136 | 137 |
| d/T × 100 (%) | 8.7 | 5.9 | 7.8 | 19.9 | 3.6 |
| Surface smoothness (decorative sheet) | ⊙ | ⊙ | ⊙ | Δ | ⊙ |
| Surface smoothness (decorative resin molded article) | ○ | ⊙ | ○ | X | ⊙ |
| Stereoscopic design effect (decorative sheet) | ⊙ | ○ | ⊙ | ⊙ | X |
| Stereoscopic design effect (decorative resin molded article) | ○ | ○ | ⊙ | ⊙ | X |
| Cracking of decorative sheet | ○ | ⊙ | ⊙ | X | ⊙ |

From the results shown in Table 1, it is apparent that when the depth d of the recess and the thickness T from the start point of the depth d to a surface on a side opposite to a surface having an irregularity shape satisfy the relationship of d/T×100=5 to 10%, the decorative sheet and the decorative resin molded article each have a high stereoscopic design effect and high surface smoothness, and cracking of the decorative sheet is effectively suppressed.

DESCRIPTION OF REFERENCE SIGNS

1: Transparent resin film layer
2: Design layer
3: Support film
4: Molded resin layer
A: Layer including at least transparent resin film layer

The invention claimed is:

1. A decorative sheet comprising a layer including at least a transparent resin film layer, wherein
   the layer including the transparent resin film layer has on one surface an irregularity shape having a recess extending into the transparent resin film layer, and
   the layer including the transparent resin film layer includes a region where a depth d of the recess in the irregularity shape and a thickness T from a start point of the depth d to a surface on a side opposite to the surface having the irregularity shape in the layer including the transparent resin film layer satisfy a relationship of d/T×100=5.9 to 8.7,
   the depth d is 8 to 13 μm,
   the layer including the transparent resin film layer includes the transparent resin film layer and a design layer,
   the recess in the irregularity shape is formed so as to extend from the design layer side to the transparent resin film layer,
   further comprising a support film layer on the surface of the layer including the transparent resin film layer, which has the irregularity shape,
   the support film layer is laminated so as to fill the recess in the irregularity shape,
   the thickness of the support film is 0.2 to 0.5 mm, and
   the decorative sheet is used for obtaining a decorative resin molded article by laminating the surface having the irregularity shape to a molded resin.

2. The decorative sheet according to claim 1, wherein the transparent film layer is formed of an acryl-based resin.

3. A decorative resin molded article obtained by laminating the decorative sheet according to claim 1 to a molded resin.

4. A decorative resin molded article obtained by laminating the decorative sheet according to claim 2 to a molded resin.

* * * * *